(12) United States Patent
Bergmeier

(10) Patent No.: US 8,196,509 B2
(45) Date of Patent: Jun. 12, 2012

(54) APPARATUS FOR SHELLING BOILED EGGS

(75) Inventor: Gerd Bergmeier, Hiddenhausen (DE)

(73) Assignee: EBM Bergmeier GmbH, Hiddenhausen (DE)

( * ) Notice: Subject to any disclaimer, the term of this patent is extended or adjusted under 35 U.S.C. 154(b) by 832 days.

(21) Appl. No.: 12/203,777

(22) Filed: Sep. 3, 2008

(65) Prior Publication Data

US 2009/0139413 A1   Jun. 4, 2009

(30) Foreign Application Priority Data

Sep. 5, 2007 (DE) .......................... 10 2007 042 175

(51) Int. Cl.
*A23N 5/00* (2006.01)

(52) U.S. Cl. .............. 99/582; 99/568; 99/581; 426/479; 198/418

(58) Field of Classification Search ............ 99/623–625, 99/637, 567–583; 426/478–479, 481–482, 426/298–299; 198/432, 389, 418.1–418.3, 198/452, 453–455, 443
See application file for complete search history.

(56) References Cited

U.S. PATENT DOCUMENTS

| | | | | |
|---|---|---|---|---|
| 1,837,357 A | * | 12/1931 | Chapman | 99/498 |
| 1,924,111 A | * | 8/1933 | Erickson | 426/484 |
| 2,465,176 A | | 3/1949 | Serbu | |
| 2,529,286 A | * | 11/1950 | Fraser | 99/510 |
| 2,646,870 A | * | 7/1953 | Parry | 198/446 |
| 3,260,348 A | * | 7/1966 | Niederer et al. | 198/389 |
| 3,311,216 A | * | 3/1967 | Leonard | 53/497 |
| 3,316,688 A | * | 5/1967 | Niederer et al. | 53/497 |
| 3,369,644 A | * | 2/1968 | Niederer | 198/389 |
| 3,552,458 A | * | 1/1971 | Whitman | 99/574 |
| 3,610,400 A | * | 10/1971 | Burkholder | 198/384 |
| 3,741,368 A | * | 6/1973 | Burkholder | 198/418.1 |
| 3,877,362 A | * | 4/1975 | Epstein et al. | 99/570 |
| 4,049,111 A | * | 9/1977 | Mosterd | 198/445 |
| 4,708,056 A | * | 11/1987 | Dinanath | 99/575 |
| 4,895,069 A | * | 1/1990 | Kristensen | 99/574 |
| 5,092,232 A | | 3/1992 | Bergmeier | |
| 6,000,526 A | * | 12/1999 | van Veldhuisen et al. | 198/446 |

FOREIGN PATENT DOCUMENTS

| DE | 42 44 508 | 5/1994 |
|---|---|---|
| EP | 0 325 349 | 7/1989 |

OTHER PUBLICATIONS

French Search Report of FR 0804830 dated Apr. 4, 2011.

* cited by examiner

*Primary Examiner* — Gene Kim
*Assistant Examiner* — Matthew B Stanczak
(74) *Attorney, Agent, or Firm* — Barnes & Thornburg LLP

(57) ABSTRACT

An apparatus for shelling boiled eggs is described. The apparatus includes a plurality of spaced-apart shelling rollers which are axially parallel to one another, are arranged in a circulating belt guided over end deflecting rollers in a conveying direction, and are driven in the same rotational direction. A plurality of longitudinal guides are arranged above a top strand of the circulating belt. Pairs of the longitudinal guides form a roof-like channel extending in the conveying direction and are moveable transversely to the conveying direction. A region of the top strand a first operating region breaking open eggshells, and a second operating region for shelling the boiled eggs.

10 Claims, 3 Drawing Sheets

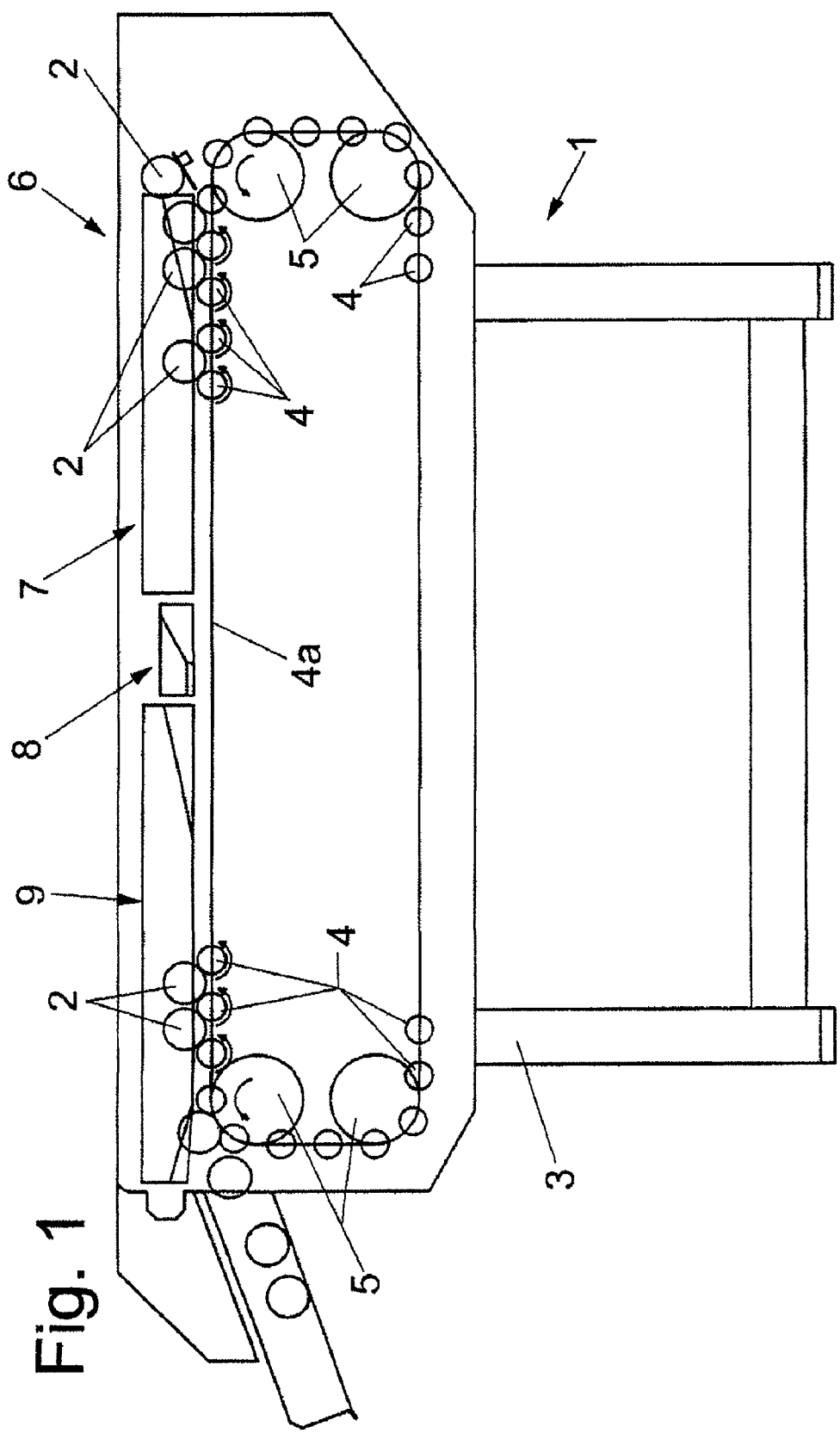

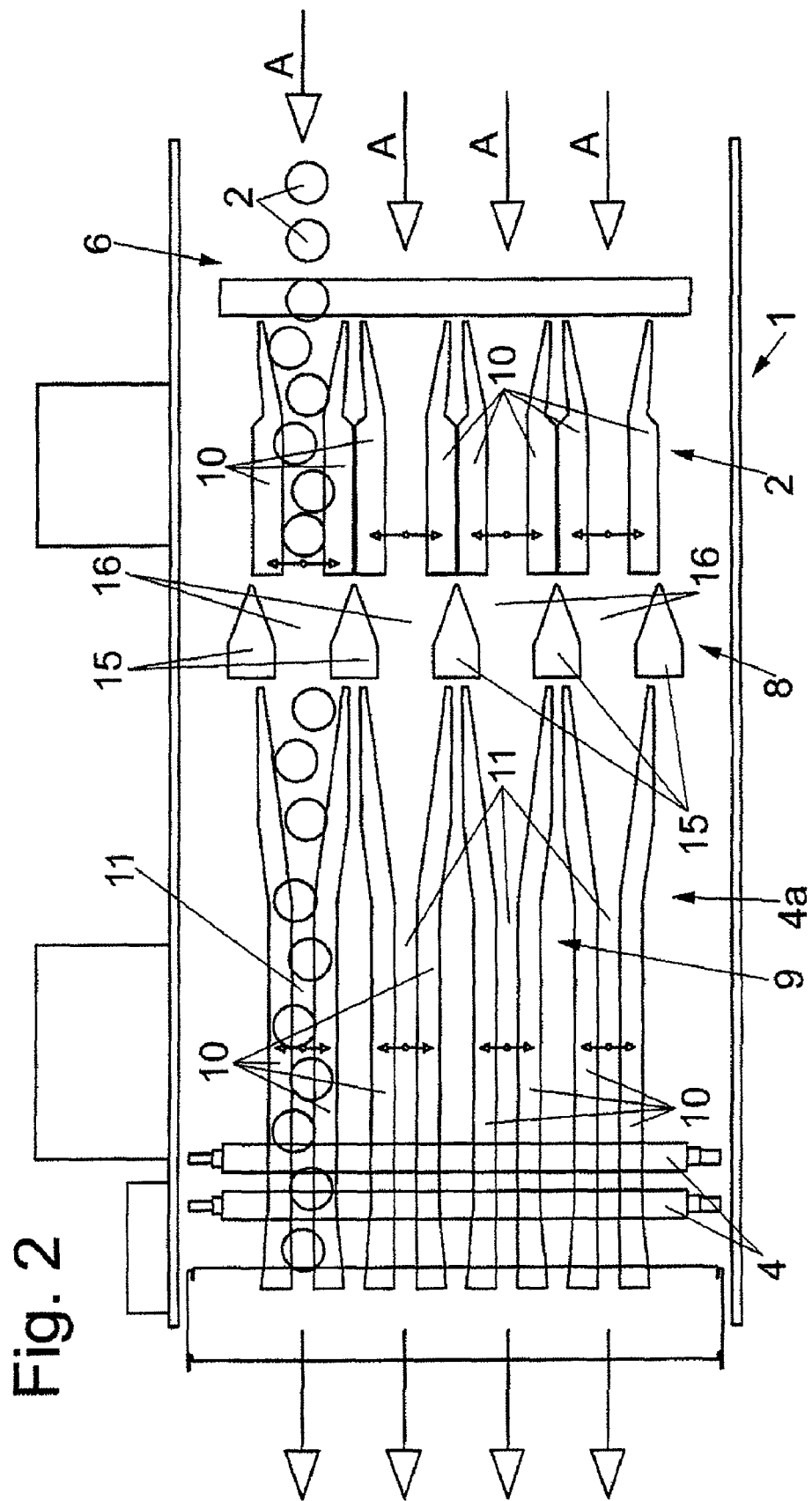

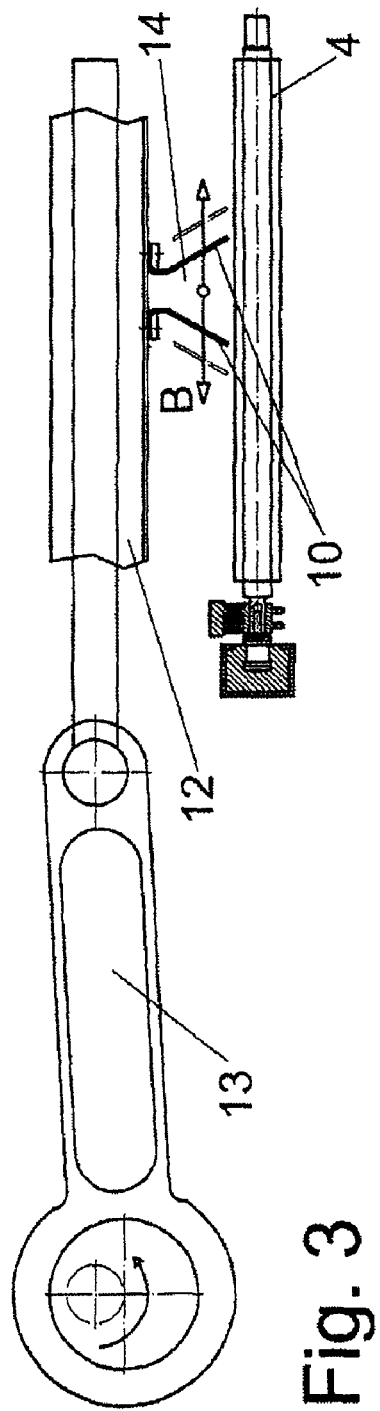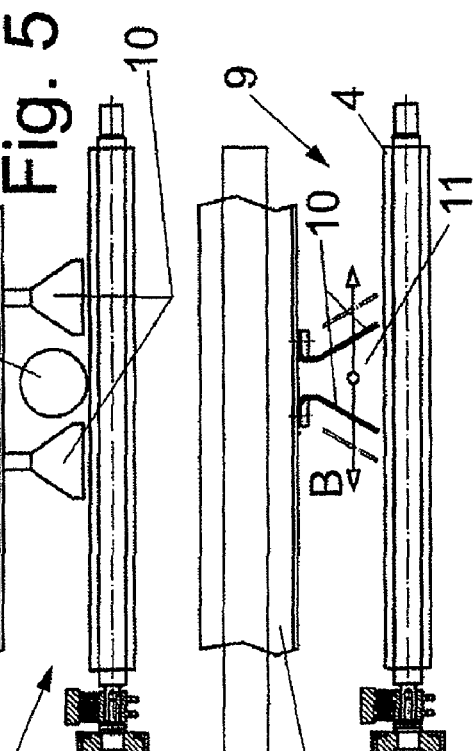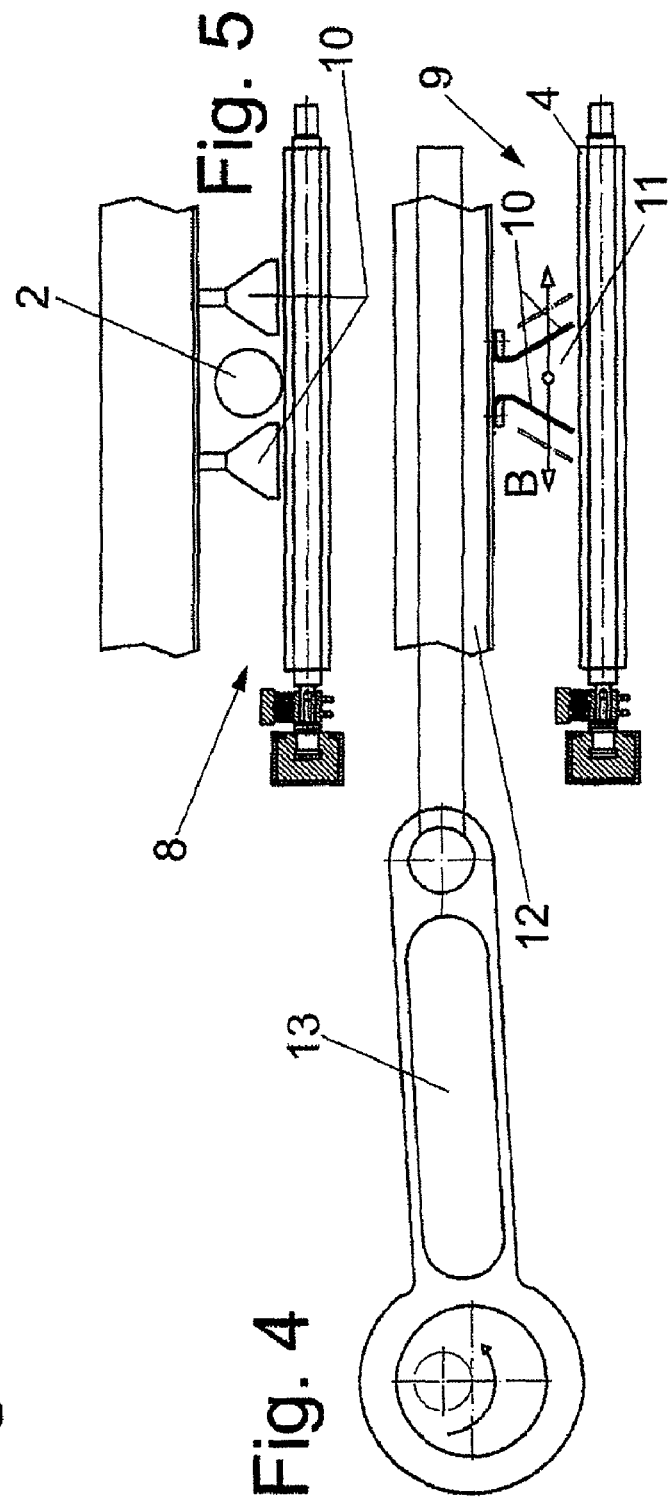

APPARATUS FOR SHELLING BOILED EGGS

CROSS-REFERENCE TO RELATED APPLICATION(S)

This is a Non-Provisional Patent Application that relies for priority on German Patent Application Serial No. 10 2007 042 175.5, filed on Sep. 5, 2007, the contents of which are incorporated herein by reference.

FIELD OF THE INVENTION

The present invention relates to an apparatus for shelling boiled. More specifically, the apparatus of the invention includes a multiplicity of spaced-apart shelling rollers which run in an axis-parallel manner to one another. The shelling rollers are guided in the manner of a circulating belt over end deflecting rollers. The shelling rollers are driven to rotate in the same direction. The apparatus of the present invention also includes a plurality of longitudinal guides which are arranged above the top strand of the circulating shelling rollers. Respective pairs of the longitudinal guides form a roof-like channel extending in the conveying direction over the top strand of the circulating shelling rollers. Respective pairs of the longitudinal guides may be moved, as a whole, transversely to the conveying direction.

DESCRIPTION OF RELATED ART

Apparatuses for shelling eggs of the generic type are known per se and have proven successful in principle. Such apparatuses are used wherever there is a need for large quantities of boiled eggs, e.g. in canteen kitchens, in the food industry or the like.

In the case of the known apparatuses of the generic type, the boiled eggs pass through the roof-like channels, which are formed by longitudinal guides, with the shelling rollers being driven constantly. As a result of the transverse movement of these channels relative to the conveying direction, the shells of the boiled eggs are first struck or broken open and subsequently, as the eggs are conveyed further, the shells are removed altogether from the boiled eggs.

The aim is for the eggs to be shelled "carefully", that is to say damage to the eggs themselves should, if possible, be avoided. In order to achieve this, the conveying speed, the rotational speed of the shelling rollers and the cycle frequency of the transverse movement of the channels have to be coordinated with sensitive adjustment.

If use is made of eggs with soft shells, coordination still be implemented to relatively good effect. For processing eggs with relatively hard shells, a high cycle frequency is necessary for the transverse movement of the channels in order for it to be possible to strike or break open reliably the shells of such eggs. This higher cycle frequency, however, is less beneficial for the actual shelling operation since, with correspondingly high cycle frequencies, there is a risk that the eggs, which have already been shelled, or partially shelled, may be destroyed.

SUMMARY OF THE INVENTION

The object of the present invention is to provide an apparatus of the generic type, which makes it possible for the eggshells to be reliably struck and broken open without the actual shelling operation being adversely affected.

This object is achieved according to the invention in that the region of the top strand, as seen in the through-passage direction, is subdivided into two operating regions, a first operating region being provided as a breaking-open station for striking and/or breaking open the eggshells, and a second, shelling region of known design.

By virtue of dividing up the overall operating region of the apparatus into two sections, namely into the region in which the eggshells are struck and/or broken open and into a region in which an actual shelling operation takes place, it is possible, then, for these two operating regions to be configured optimally in accordance with the sought-after effect in each case. With respect to this configuration, the operating region, in which the eggshells are to be struck or broken open, may be configured separately from, and completely independently of, the actual shelling region. As a result, eggs with shells of different levels of hardness may be reliably struck and broken open and also carefully shelled.

The first region, for striking and breaking open the eggshells, may advantageously comprise a plurality of longitudinal guides which, in pairs in each case, form a roof-like directing channel and may be driven as a whole transversely to the conveying direction and independently of the channels located in the shelling region.

It is thus possible, if required, for the cycle frequency of the directing channels in the breaking-open or striking region to be set to a higher level than the cycle frequency in the shelling region. As a result, even eggs with relatively hard shells may be struck and broken open reliably without an adverse effect on the actual shelling operation.

It is likewise conceivable for the angles at which the longitudinal guides are positioned in relation to one another in the striking or breaking-open region to be changed in relation to the corresponding angles in the shelling region such that these angles are considerably more acute in the breaking-open or striking region than in the shelling region. As a result, the shells of the eggs which are to be struck or broken open are subjected to a significantly higher level of striking action than would be possible with longitudinal guides which enclose a relatively large angle between them, as is the case in the shelling region.

It is also possible to have a combination of the two measures, that is to say a high cycle frequency for the directing channels in respect of the movement transverse to the conveying direction combined with a relatively acute angle between the individual longitudinal guides ranging as far as the longitudinal guides being arranged parallel to one another.

Further features of the invention will be made apparent from the discussion that follows and the drawings appended hereto.

BRIEF DESCRIPTION OF THE DRAWINGS

Exemplary embodiment(s) of the invention will be described in more detail hereinbelow and is (are) illustrated in the accompanying drawings, in which:

FIG. 1 shows a side view schematic of an apparatus according to the invention for shelling boiled eggs, FIG. 2 shows a top plan view of the apparatus in FIG. 2, FIG. 3 shows a schematically illustrated cross section through the apparatus according to the invention in the operating region for striking and/or breaking open the shells of boiled eggs, FIG. 4 shows a schematically illustrated cross section through the apparatus according to the invention in the shelling region, and FIG. 5 shows a schematically illustrated cross section, through a centering arrangement, which is provided between the operating region for striking and/or breaking open the eggs and the shelling region.

DESCRIPTION OF EMBODIMENT(S) OF THE INVENTION

FIGS. 1 and 2 illustrate an apparatus, designated as a whole by 1, which is intended for shelling boiled eggs 2. The apparatus 1 has a framework 3 which carries a transporting arrangement in the form of a multiplicity of spaced-apart shelling rollers 4 which run in an axis-parallel manner to one another (i.e., are axially parallel), are guided in the manner of a circulating belt over end deflecting rollers 5 and are driven in rotation in the same direction. The eggs 2 which are to be shelled are set down on the top strand 4a of the circulating transporting rollers 4 in the region of a transfer station 6. The transfer station 6 arranges or locates the plurality of eggs 2 one beside the other, between two adjacent shelling rollers 4.

As FIG. 2 shows very clearly, the top strand 4a of the circulating shelling rollers 4 may be subdivided into three regions. The three regions are defined according to the transporting direction, which is indicated by the arrows "A" in FIG. 2. The first operating region 7, which follows the transfer station 6, may be referred to as the striking and/or breaking-open region. The next (or second) region, designated 8, may be referred to as the centering arrangement. The operating region which follows this, designated 9, may be regarded as the shelling region (or third region).

As may be understood from FIG. 4 in conjunction with FIG. 2, a plurality of longitudinal guides 10 are provided in the shelling region 9. The longitudinal guides 10 are positioned above the top strand 4a. When taken in pairs, in each case, the longitudinal guides 10 form a roof-like channel 11 extending in the conveying direction of the circulating shelling rollers 4. The longitudinal guides 10 are fastened, at predetermined intervals from one another in each case, on a carrying framework 12. This carrying framework 12 may be moved cyclically back and forth—for example by a driving connecting rod 13—transversely to the transporting direction of the shelling rollers 4. This transverse movement is indicated by the double arrow "B" in FIG. 4.

It is also the case that the striking and/or breaking-open region 7 is equipped with longitudinal guides 10 which, in pairs in each case, form directing channels 14. The directing channels 13 may be appreciated from the illustration in FIG. 3, for example. It is also the case that the longitudinal guides 10 in the striking and/or breaking-open region 7 are fastened on a carrying framework 12. In this embodiment, the longitudinal guides 10 may be moved back and forth, for example, by a driving connecting rod 13. The longitudinal guides may be moved transversely to the transporting direction of the shelling rollers 4, which is in the direction of the double arrow "B" in FIG. 3.

The above-mentioned centering arrangement 8 is provided between the operating regions 7 and 9. This arrangement allows eggs 2, which are leaving the operating region 7, to be transferred reliably into the entry region of the shelling region 9.

A feature of the present apparatus, then, is that the striking and/or breaking-open region 7 of the apparatus 1 as a whole is configured independently of the shelling region 9.

In respect of the exemplary embodiment illustrated, this means that the cycle frequency at which the longitudinal guides 10 in the striking and/or breaking-open region 7 are moved back and forth is independent of the cycle frequency of the transverse movement of the longitudinal guides 10 in the shelling region 9.

In particular, the cycle frequency for the transverse movement of the longitudinal guides 10 in the operating region 7 is higher than the cycle frequency in the actual shelling region 9. It is thus possible for the shells of boiled eggs 2 to be reliably struck and/or broken open before they pass into the actual shelling region 9.

Moreover, the angles enclosed between the longitudinal guides 10 in the operating region 7 may be selected to be smaller, or more acute, than the angles of the longitudinal guides 10 provided in the actual shelling region 9.

In an extreme case, the longitudinal guides 10 in the operating region 7 may even be arranged to run parallel to one another.

By virtue of the reduced angle of the longitudinal guides 10 in the operating region 7, the forces to which the eggs 2 are subjected as the longitudinal guides 10 are moved back and forth are greater in the operating region 7 than in the shelling region 9.

By virtue of the operating regions 7 and 9 being separated from one another, it is possible to optimize the gearing arrangement of the longitudinal guides 10 in the operating regions 7, 9 with respect to one another. In other words, it is possible to optimize the frequency at which the longitudinal guides 10 in the operating region 7 are moved back and forth transversely to improve the operation of the apparatus 1. This has no effect on the actual shelling operation, which takes place in the operating region 9. Here, it is then possible, in turn, for everything to be configured for an optimum, careful shelling operation.

The longitudinal guides 10 may be produced both from plastic and from metal, although, for hygiene-related reasons, metal, in particular stainless steel, is preferred.

Various directing bodies 15 are arranged one beside the other in the centering region 8 and, in pairs in each case, form an entry funnel 16 for the eggs 2 which are to be centered.

These directing bodies 15 are also preferably produced from metal, in particular from stainless steel.

The longitudinal guides 10 are preferably designed as directing plates, but it is also possible to realize other embodiments. For example the longitudinal guides 10 may be constructed as a plurality of bars, preferably round bars, running parallel to one another.

What is claimed is:

1. An apparatus for shelling boiled eggs, comprising:
a plurality of spaced-apart shelling rollers which are axially parallel to one another, are arranged in a circulating belt guided over end deflecting rollers in a conveying direction, and are driven in the same rotational direction,
a plurality of longitudinal guides having an angled portion at an entry and a substantially straight portion lying in a substantially horizontal plane along a length and extending from the angled portion, the plurality of longitudinal guides arranged above a top strand of the circulating belt, wherein pairs of the plurality of longitudinal guides form a roof-like channel extending in the conveying direction and are moveable transversely to the conveying direction,
wherein a region of the top strand is subdivided into a first operating region including at least two of the plurality of longitudinal guides configured to break open shells of the boiled eggs, a second operating region including at least two of the plurality of longitudinal guides configured to shell the boiled eggs, and a third operating region located between the first and second operating regions, the third operating region including a centering arrangement including a plurality of directing bodies disposed adjacent to one another and, in pairs, the directing bodies forming an entry funnel that widens toward the first operating region and directs the boiled eggs into the second operating region;

wherein pairs of the first set of longitudinal guides form a first angle therebetween and are moveable transversely at a first frequency;

wherein pairs of the second set of longitudinal guides form a second angle therebetween and are moveable transversely at a second frequency; and wherein the first angle is smaller than the second angle.

2. The apparatus according to claim 1, wherein the first angle is 0°.

3. The apparatus according to claim 1, wherein the longitudinal guides are produced from a group comprising plastic or metal.

4. The apparatus according to claim 3, wherein the longitudinal guides comprise stainless steel.

5. The apparatus according to claim 1, wherein the directing bodies comprise stainless steel.

6. The apparatus according to claim 1, wherein the plurality of longitudinal guides comprise directing plates.

7. The apparatus according to claim 1, wherein the plurality of longitudinal guides comprise a plurality of bars running parallel to one another.

8. The apparatus according to claim 7, wherein the bars are round bars.

9. The apparatus of claim 1, wherein the first frequency is greater than the second frequency.

10. The apparatus according to claim 1, wherein the directing bodies are produced from a group comprising plastic or metal.

* * * * *